United States Patent [19]

Iwatsuki et al.

[11] Patent Number: 5,199,326
[45] Date of Patent: Apr. 6, 1993

[54] IDLE UP OF ENGINE OF AUTOMOBILE ACCORDING TO ELEVATION OF TRANSMISSION OIL TEMPERATURE

[75] Inventors: Kunihiro Iwatsuki, Toyota; Hidehiro Oba, Aichi; Hiromichi Kimura, Toyota, all of Japan

[73] Assignee: Toyota Jidosha Kabushiki Kaisha, Toyota, Japan

[21] Appl. No.: 913,760

[22] Filed: Jul. 17, 1992

[30] Foreign Application Priority Data

Nov. 28, 1990 [JP] Japan ............................. 2-328274

Related U.S. Application Data

[63] Continuation-in-part of Ser. No. 795,841, Nov. 21, 1991, abandoned.

[51] Int. Cl.⁵ .......................................... F02D 41/08
[52] U.S. Cl. ........................ 74/873; 74/844; 364/424.1; 123/339; 60/329; 180/69.3
[58] Field of Search .............. 74/844, 861, 872, 873; 364/424.1; 123/339; 60/329; 180/69.3

[56] References Cited

U.S. PATENT DOCUMENTS

| | | | |
|---|---|---|---|
| 2,915,914 | 12/1959 | Burnell et al. | 74/873 |
| 3,581,852 | 6/1971 | Griffen | 74/873 X |
| 4,289,100 | 9/1981 | Kinugawa et al. | 123/339 |
| 4,312,311 | 1/1982 | Iwata | 74/873 X |
| 4,671,139 | 6/1987 | Downs et al. | 74/861 X |
| 5,054,450 | 10/1991 | Oota et al. | 123/339 X |

FOREIGN PATENT DOCUMENTS 1-30842  2/1989  Japan ............................. 74/873

*Primary Examiner*—Allan D. Herrmann
*Assistant Examiner*—William O. Trousdell
*Attorney, Agent, or Firm*—Oblon, Spivak, McClelland, Maier & Neustadt

[57] ABSTRACT

In an automobile equipped with an engine, an automatic transmission including hydraulically actuated friction engaging means for shifting stages of the transmission, and an oil pump driven by the engine to provide a pressurized oil for actuating the friction engaging means, the capacity of the oil pump is so minimized as to be only enough for shifting the stages of the transmission, if the idle speed of the engine is temporally increased, when the temperature of oil of the transmission is above a threshold value.

4 Claims, 3 Drawing Sheets

IDLE UP OF ENGINE OF AUTOMOBILE ACCORDING TO ELEVATION OF TRANSMISSION OIL TEMPERATURE

This application is a continuation-in-part of application Ser. No. 07/795,841, filed on Nov. 21, 1991, now abandoned.

BACKGROUND OF THE INVENTION

1. Field of the Invention

The present invention relates to an idle speed control of an engine of an automobile, and more particularly, to an idle speed control of an engine of an automobile equipped with an automatic transmission including hydraulically actuated friction engaging means.

2. Description of the Prior Art

The idle speed of an engine of an automobile is controlled, as a matter of principle, to be an allowable minimum speed level, on the condition that the stable operation of the engine is ensured, in order to save the fuel consumption. Since such a minimum speed level to ensure the stable operation of the engine needs to be elevated when atmospheric air and/or the engine is cold, it is known, as the art of "idle-up", to increase the idle speed according to air temperature and/or engine temperature, particularly when the engine is started from the cold state. The idle-up is generally also executed in an automobile equipped with an air conditioner so that the operation of the air conditioner is maintained during the engine idling condition of an automobile.

According to the developments of the modern electronic automotive control systems various arts have been proposed to control the idle speed of the engine in relation to other operational conditions of the automobile, such as to prepare two staged idle-up speed levels for an engine combined with an automatic transmission so that a lower speed idle-up is executed during an idling where the automatic transmission is shifted to one of the drive ranges or the reverse range with no brakes being actuated, while a higher speed idle-up is executed during an idling where the automatic transmission is shifted to the neutral or parking range or a brake is actuated, from the view point of maintaining a stable idle operation of the engine while avoiding an unintentional start of the automobile (Japanese Utility Model Laid-open Publication 1-111160);

to control the idle operation of an engine combined with a torque converter under a modification of a target value for the idle speed according to whether a torque converter traction control system which selectively disengages the torque converter during the idling is in operation or not, so that the target value is increased to ensure the stable operation of the engine when the torque converter is disengaged by the traction control system as compared with the conventional idling in which the engine, although it rotates at a relatively low speed while idly driving the torque converter, is supplied with a correspondingly increased rate of fuel for generating more power for idly driving the torque converter than in an idling with no such torque converter load, and therefore operates stably even at such a low idle speed (Japanese Patent Laid-open Publication 61-250353);

to control the idle operation of an engine in relation to oil temperature of an automatic transmission so that the ignition timing of the engine is delayed when the oil temperature of the transmission rises, thereby moderating the peaks of the engine output torque in the idling so as thereby to obtain the effect of decreasing a gear noise of the transmission which increases as the oil temperature of the transmission rises due to a reduction of viscosity of oil in the backlash spaces in the meshing gears (Japanese Patent Laid-open Publication 61-167170), and to control the idle operation of an engine combined with an automatic transmission in relation to shifting into operation of the transmission so that, when the range select lever is shifted from the parking or neutral range to one of the drive ranges or the reverse range, an additional amount of fuel is supplied to the engine with a delay time which is shorter as oil temperature of the transmission is higher, so as thereby to improve the stability of the idle operation of the engine in a period between the setting up of a speed stage in the transmission and a depression of the accelerator pedal, wherein the delay time is controlled to be a minimum time span not to allow the engine operation to become unstable due to an increase of the load imposed on the engine as a result of the engagement of the transmission but not to cause revving up of the engine by too early increase of fuel supply, taking it into consideration that the oil temperature of the transmission governs the speed of setting up speed stages of the transmission (Japanese Patent Laid-open Publication 62-131939).

During the idling of an automobile equipped with an automatic transmission a substantial part of the power generated by the engine is consumed by an oil pump which provides a hydraulic pressure source for the operation of the automatic transmission. In the oil pumps practically available for such a purpose a certain amount of leakage of oil from its delivery side to its suction side is unavoidable. The amount of such oil leakage generally increases as the oil temperature rises, because the viscosity of oil lowers according to the elevation of its temperature. In view of this fact it has conventionally been a tacit understanding in the design of the oil pump that its capacity is so selected that it can provide a required amount of delivery of oil even at a relatively high oil temperature estimated to occur in a wide range of operating conditions, in spite of a correspondingly increased leakage of oil. This fact means that in a lot of operating conditions the oil pump is delivering a substantial amount of needless oil, consuming a corresponding amount of power for no use.

Therefore, there is another aspect in the elevation of oil temperature of the automatic transmission which would be a subject for further improvement with respect to the idle operation of the engine of an automobile equipped with an automatic transmission.

In this connection, it is noted that the largest delivery of oil from the oil pump is required during a speed stage shifting of the transmission. In other words, when the transmission is operating at any speed stage with certain hydraulically actuated friction engaging means such as clutches and brakes being maintained in their fully engaged condition, no substantial amount of delivery of oil is required. Therefore, it is only during the speed stage shifting that the problem of shortage of delivery of oil from the oil pump would occur due to an increased leakage of oil in the oil pump according to the elevation of oil temperature.

SUMMARY OF THE INVENTION

In view of the above, it is the object of the present invention to provide such a control system for controlling the idle operation of an engine of an automobile equipped with an automatic transmission including hydraulically actuated friction engaging means that allows an oil pump providing a hydraulic pressure source for operating the transmission to be further minimized in its normal capacity.

According to the present invention the above-mentioned object is accomplished by a control system for controlling idle operation of an engine of an automobile equipped with an automatic transmission including hydraulically actuated friction engaging means for shifting stages of the transmission and an oil pump driven by the engine to provide a pressurized oil for actuating said friction engaging means, comprising means for detecting temperature of the oil, means for detecting a stage shifting of the transmission, and means for determining an idle rotation speed of the engine for the idle operation thereof so as to temporarily increase said idle rotation speed for a period determined based upon a detection of the stage shifting of the transmission by said stage shifting detection means only when the oil temperature detected by said oil temperature detection means is higher than a threshold value.

When the idle speed of the engine is controlled by such a control system as described above, the capacity of the oil pump can be further minimized so that it may only be enough to maintain the actuation of the friction engaging means after the completion of the stage shifting of the transmission even when the oil temperature of the transmission reaches a relatively high temperature level.

The speed stage shifting based upon which said temporal increase of the idle rotation speed is executed may be a shifting from a parking alternatively neutral stage to a stage for which more than one of said friction engaging means are newly engaged.

The end of said period may be determined by an increase of an oil pressure in at least one of said friction engaging means up to a predetermined pressure level.

BRIEF DESCRIPTION OF THE DRAWING

In the accompanying drawing.

DESCRIPTION OF THE PREFERRED EMBODIMENT

In the following the present invention will be described with respect to a preferred embodiment thereof with reference to the accompanying drawings.

Figure 1:
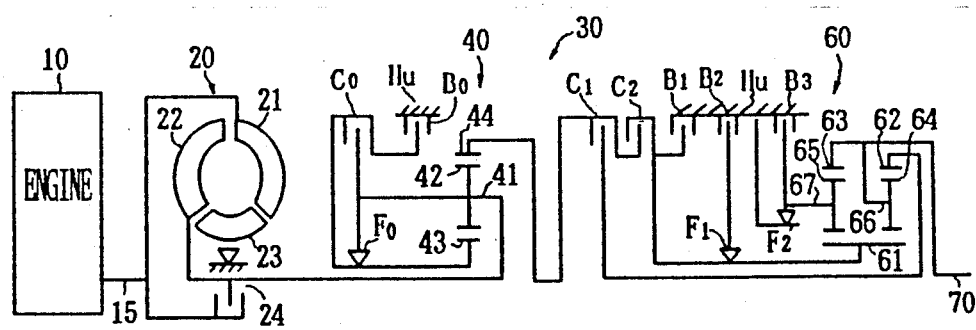
FIG. 1 is a diagrammatical illustration of an example of the power system of an automobile in which the control system for controlling the idle operation of the engine according to the present invention may be incorporated.

Referring to FIG. 1 illustrating diagrammatically a power system of an automobile to which the control system according to the present invention may be incorporated, the power system comprises an engine 10, a torque converter 20, and a transmission gear 30. The torque converter 20 is of a conventional type having a pump 21 connected with the engine via an input shaft 15, a turbine 22, a stator 23, and a lock-up clutch 24 for selectively directly connecting the pump 21 with the turbine 22. The transmission gear 30 comprises a first gear unit 40 including a planetary gear mechanism having a sun gear 43, a ring gear 44, a planetary pinion 42 and a carrier 41 connected with the turbine 22 of the torque converter 20, a clutch C0 for selectively connecting the sun gear 43 with the carrier 41, a brake B0 for selectively braking the sun gear 43 relative to a housing Hu and a one way clutch F0 for torque-transmittingly connecting the sun gear 43 with the carrier 41 only in one rotational direction, and a second gear unit 60 including a first planetary gear mechanism having a sun gear 61, a ring 62, a planetary pinion 64 and a carrier 66, a second planetary gear mechanism having a sun gear common with the sun gear 61 of the first planetary gear mechanism, a ring gear 63, a planetary pinion 65 an a carrier 67, a clutch C1 for selectively connecting the ring gear 62 with the ring gear 44 of the first gear unit 40, a clutch C2 for selectively connecting the sun gears 61 with the ring gear 44 of the first gear unit 40, a brake B1 for selectively braking the sun gears 61 relative to the housing Hu, a series combination of a brake B2 and a one way clutch F1 for selectively braking the sun gears 61 only in one rotational direction when the brake B2 is engaged, a brake B3 for selectively braking the carrier 67 relative to the housing Hu, and a one way clutch F2 for braking the carrier 67 relative to the housing Hu only in one rotational direction, wherein the carrier 66 and the ring gear 63 are connected with one another to serve as an output shaft of the transmission.

Figure 2:
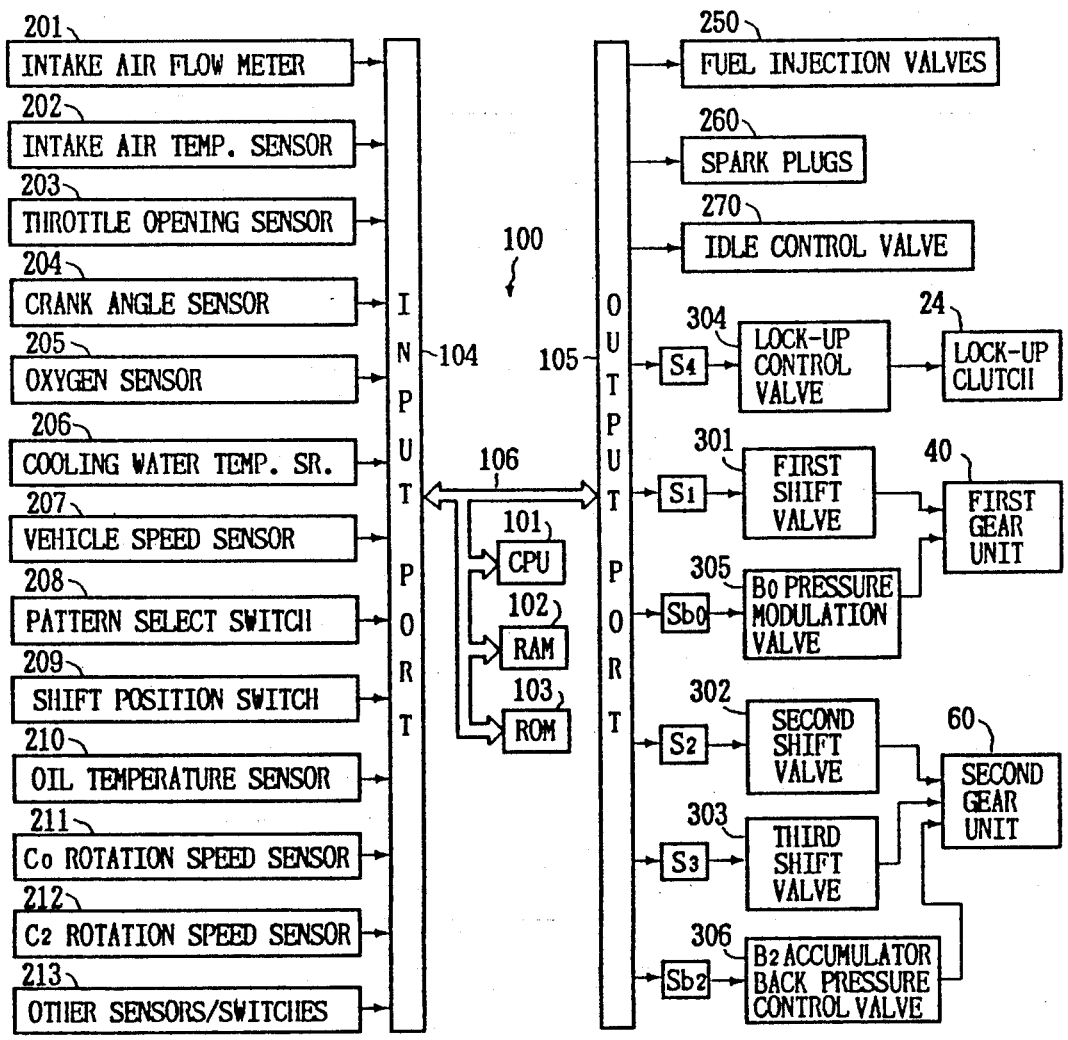
FIG. 2 is a diagrammatical illustration of the control system for operating the power system shown in FIG. 1.

The clutches C0, C1 and C2 and the brakes B0, B1, B2 and B3 are hydraulically actuated to be engaged or disengage by an electro-hydraulic control system the general concept of which is well known in the art in such a manner that solenoid-operated change-over valves change over supply and exhaust of hydraulic pressure to and from the respective clutches and brakes under the control of an electronic control unit. FIG. 2 shows such an electro-hydraulic control system in a diagrammatical illustration.

The tandem connection of the first gear unit 40 and the second gear unit 60 is controlled according to the conventional method to provide four forward speed stages by the second gear unit 60 being changed over between three different gear ratios while the first gear unit 40 is maintained in its lower gear stage so that the 1st, 2nd and 3rd speed stages are provided, and then by the first gear unit 40 being changed over to its higher gear stage while the second gear unit 60 is maintained at the 3rd speed stage so that the 4th speed stage is provided as an overdrive stage, by the electro-hydraulic control unit shown in FIG. 2, according to on and off combinations of the clutches C0–C2, the brakes B0–B3 and the one way clutches F1–F2 as shown in Table 1:

TABLE 1

| Range | Speed | $C_0$ | $B_0$ | $C_1$ | $C_2$ | $B_1$ | $B_2$ | $B_3$ | $F_0$ | $F_1$ | $F_2$ |
|---|---|---|---|---|---|---|---|---|---|---|---|
| P | — | o | | | | | | | | | |
| R | — | o | | | o | | | o | | | |
| N | — | o | | | | | | | | | |
| D | 1st | o | | o | | | | | o | | o |
| D | 2nd | o | | o | | | o | | o | o | |
| D | 3rd | o | | o | o | | | | o | o | |

TABLE 1-continued

| Range | Speed | C₀ | B₀ | C₁ | C₂ | B₁ | B₂ | B₃ | F₀ | F₁ | F₂ |
|---|---|---|---|---|---|---|---|---|---|---|---|
| D | 4th |   | o | o | o |   | o |   |   |   |   |
| 2 | 1st | o |   | o |   |   |   |   | o |   | o |
| 2 | 2nd | o |   | o |   | o | o |   | o | o |   |
| L | 1st | o |   | o |   |   |   | o | o |   | o |

In the above table, "o" indicates that the clutch, brake or one way clutch is engaged at the corresponding speed stage under the corresponding shift range.

Referring to FIG. 2, the electro-hydraulic control system comprises an electronic control unit 100 which is now available in various standards in the art as a hardware generally including a central processing unit (CPU) 101, a random access memory (RAM) 102, a read only memory (ROM) 103, an input port means 104, an output port means 105 and a common bus means 106 interconnecting these components.

The electronic control unit 100 is supplied with various data through the input port means 104 such as intake air flow rate from an intake air flow meter 201, intake air temperature from an intake air temperature sensor 202, throttle opening from a throttle sensor 203, engine rotation angle as well as speed from a crank angle sensor 204, excess air ratio from an oxygen sensor 205, engine temperature from cooling water temperature sensor 206, vehicle speed from a vehicle speed sensor 207, patterns of driving such as the economy pattern putting preference on the economical performance of the vehicle and the power pattern putting preference on the power performance of the vehicle from a pattern select switch 208, shift positions such as the R, N, D, 2 and L set by a manual lever from a shift position switch 209, oil temperature of the transmission from an oil temperature sensor 210, rotation speed of an outer drum of the clutch Co from a C0 rotation speed sensor 211, rotation speed of an outer drum of the clutch C2 from a C2 rotation speed sensor 212 and other data from other sensors and/or switches, including an air conditioner switch, or the like generally designated by 213.

In the electronic control unit 100, the CPU 101 conducts various calculations based upon the data received from said sensors and/or switches and the programs stored in the ROM 103 in cooperation of the RAM 102, including the determination of the amount of fuel to be injected through fuel injection valves 250, the determination of the ignition timing to operate spark plugs 260, and the determination of the idle rotation speed of the engine to control an idle control valve 270 in relation to the fuel injection valves 250 and the spark plugs 260.

The CPU 101 further conducts the calculations and determinations on various speed stage shiftings to output control signals to a hydraulic control means including various standard components not shown in the figure and particularly to the following components:

S1 is a solenoid valve which controls according to on and off thereof changing-over of a first shift valve 301 which controls supply and exhaust of hydraulic pressure to and from the clutch C0 and the brake B0 of the first gear unit 40.

S2 and S3 are solenoid valves which control according to on and off thereof changing-over of a second shift valve 302 and a third shift valve 303 which control supply and exhaust of hydraulic pressure to and from the clutches C1 and C2 and the brakes B1, B2 and B3 of the second gear unit 60. An example of more detailed constructions of the combination of the solenoid valves S2 and S3 and the shift valves 302 and 303 is shown in U.S. Pat. No. 5,029,493 assigned to the same assignee as the present application, in which the shift valve 302 is changed over between a first shift position for proving the 1st speed stage and a second shift position for providing the 2nd, 3rd and 4th speed stages according to on and off of the solenoid valve S2, while the shift valve 303 is changed over between a first shift position for proving the 1st and 2nd speed stages and a second shift position for providing the 3rd and 4th speed stages according to on and off of the solenoid valve S3. Such a construction with respect to the combination of the solenoid valves S2 and S3 and the shift valves 302 and 303 is herein incorporated by the reference to the above-mentioned U.S. patent.

S4 is a solenoid valve which controls according to on and off thereof change-over of a lock-up control valve 304 which controls supply and exhaust of a hydraulic pressure to and from the lock-up clutch 24.

Sb0 is a solenoid valve which controls according to periodical on and off thereof an opening of a B0 pressure modulation valve 305 which controls a hydraulic pressure in the brake B0 so that the pressure in the brake B0 is continually changed according to the duty ratio of the on and off of the solenoid valve Sb0.

Sb2 is a solenoid valve which controls according to periodical on and off thereof an opening of a B2 accumulator back pressure control valve 306 which controls a back pressure in an accumulator for the brake B2 so that the progress of engagement or disengagement of the brake B2 is continually controlled according to the duty ratio of the on and off of the solenoid valve Sb2.

Figure 3:
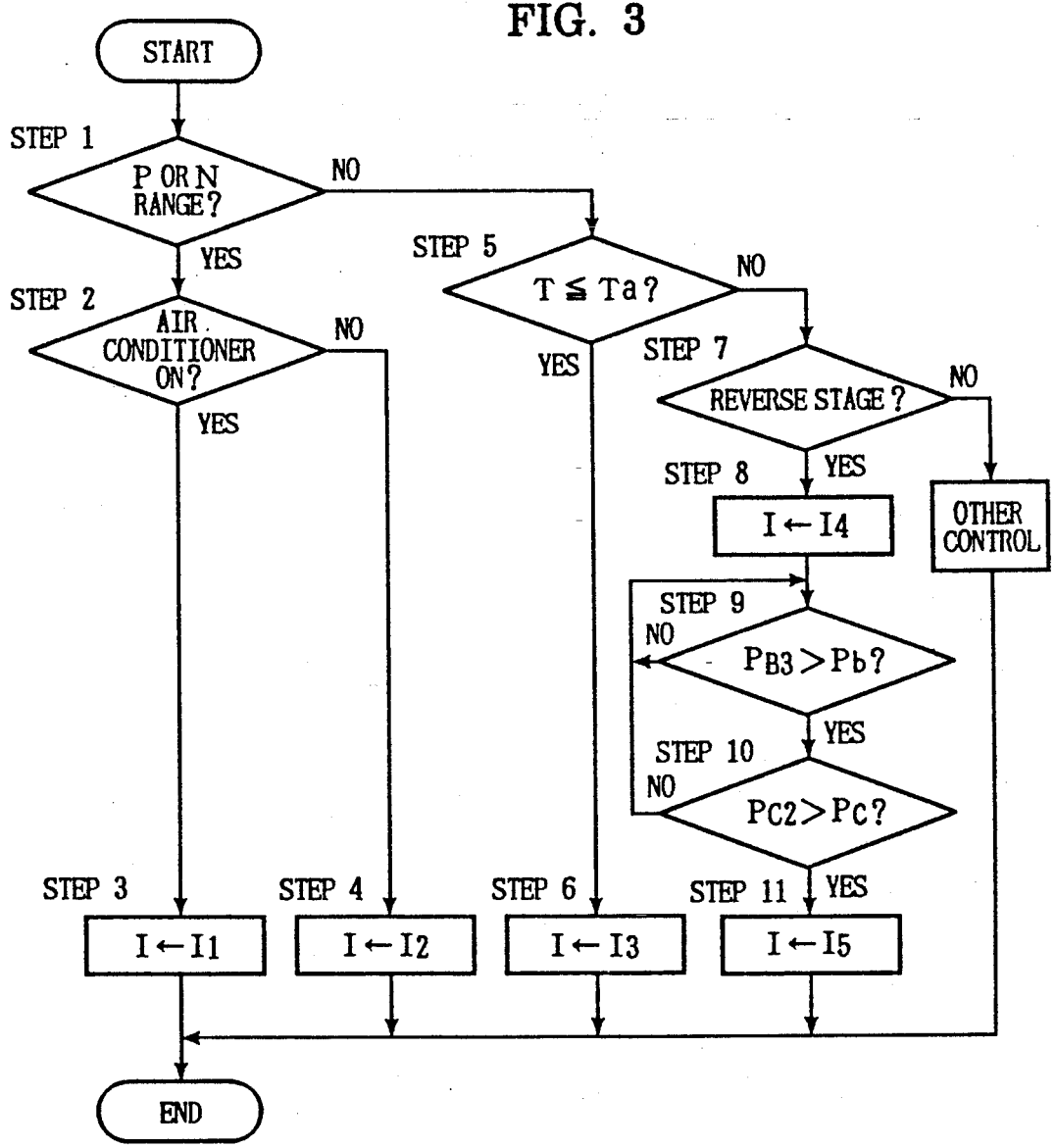
FIG. 3 is a flowchart showing an embodiment of the control system according to the present invention in the form of flow of operation thereof.

The idle speed control of the engine according to the present invention will now be described with reference to FIGS. 3-5. When the control program for the operation of the control system according to the present invention is started, in step 1, it is judged if the transmission is in the parking (P) range or the neutral (N) range. If the answer is yes, the control process proceeds to step 2, and it is judged if an air conditioner is put on. If the answer is yes, the control process proceeds to step 3, and a target value I for the idle rotation speed of the engine is set to I1, whereas, if the answer in step 2 is no, the control process proceeds to step 4, and it is judged if the oil temperature of the transmission T is not higher than a threshold value To. If the answer is yes, the control process proceeds to step 4-1, and the target value I is set to I2-1. If the answer in step 4 is no, the control process proceeds to step 4-2, and the target value I is set to I2-2. The magnitudes of I1, I2-1, I2-2 etc. will be described later.

Returning to step 1, if the answer is no, the control process proceeds to step 5, and it is judged if the oil temperature of the transmission T is not higher than a threshold value Ta. The threshold value Ta is such a temperature above which the viscosity of oil lowers so much that the oil leakage from the delivery side to the suction in the oil pump for the transmission becomes substantial. This threshold value Ta may be a temperature level which is reached during a normal operation of the automobile under a moderate climate after the warming up of the transmission, as will be understood from the following descriptions. If the answer in step 5 is yes, i.e. if the oil temperature is not higher than the threshold value Ta, the control process proceeds to step 6, and the target value I for the Idle speed of the engine is set to I3, whereas, if the answer in step 5 is no, the control process proceeds to step 7.

In step 7, it is judged if the speed stage instructed for the transmission is the reverse stage. If the answer is yes, the control process proceeds to step 8, and the target value I is set to I4, and then the control process proceeds to step 9.

In step 9, it is judged if an oil pressure PB3 of the brake B3 is higher than a check value Pb. As is understood from Table 1, when the transmission is shifted from a parking or neutral state under the parking or neutral range to the reverse stage, the brake B3 and the clutch C2 are newly engaged. In the example of the transmission gear shown in FIG. 1, the hydraulic system for actuating the friction engaging means is generally so designed that in the shifting from the parking or neutral state to the reverse stage, the engagement of the brake B3 proceeds faster than the clutch C2 upon the simultaneous start of supply of oil to the respective friction engaging means. The check value Pb is an oil pressure at which the brake B3 gets into a substantial engagement, as shown in FIG. 5.

Since the answer in step 9 is no for the time being, the control process circulates around step 9 in the meantime, and when its answer changes from no to yes, the control process proceeds to step 10. In step 10, it is judged if an oil pressure PC2 of the clutch C2 is higher than a check value Pc at which the clutch C2 gets into a substantial engagement, as also shown in FIG. 5. After having circulated around steps 9 and 10 for a while, when the answer in step 10 changes from no to yes, the control process proceeds to step 11, and the target value I is set to I5.

When the answer in step 7 is no, it means that the transmission is instructed for a shifting to one of the forward drive stages, although it would generally be the 1st speed stage that the transmission is first instructed for the shifting when the range select lever is shifted from the parking or neutral range to one of the forward drive ranges. When the forward drive range is the D range or the 2 range, the clutch C1 only is newly engaged, whereas when the forward drive range is the L range, the clutch C1 and the brake B3 are newly engaged. In either case, a series of steps similar to steps 8, 9, 10 and 11 suitable for each shifting may be executed to set up two staged values for target value I according to the progress of engagement of the friction engaging means. In this case, it would also be conceivable to execute such a two staged setting of the target value I only when two friction engaging means such as clutch C2 or C1 and brake B3 are newly engaged as in the shifting from the parking or neutral state to the reverse stage or the 1st speed stage under the L range, considering that a relatively large amount of oil is required when two friction engaging means are simultaneously actuated. In any event, such a control operation is shown in the form of "OTHER CONTROL" in FIG. 3 in order to avoid redundancy of the description.

Figure 4:
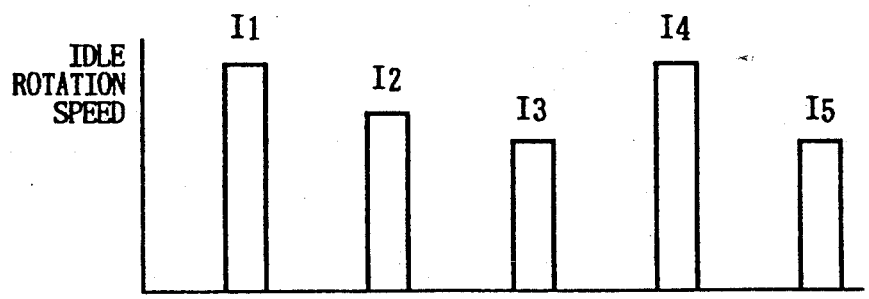
FIG. 4 is a graph showing a relative arrangement of the magnitude of idle rotation speed for various cases.

The magnitudes of the above-mentioned values I1–I5 are exemplarily shown in FIG. 4 in comparison with one another. When the automobile is in the idling state with the transmission being shifted to the parking or neutral range and the air conditioner being put on, it is desirable that the idle speed of the engine is relatively high so that a sufficient operation of the air conditioner is available, while there is no need to consider an unintentional creeping of the automobile. Therefore, the target value I1 is determined to be a relatively high value. When the automobile is in the idling state, even if the air conditioner is not put on, it is desirable that the idle speed of the engine is still maintained at a relatively high speed level, not so high as in the idling with the air conditioner being put on but high enough to maintain any long term idling operation in a stabilized condition (not to cause engine stop when the driver has left the automobile) and also to maintain the battery in a well charged condition. Therefore, the target value I2 is determined to be lower than I1 but to be higher than I3 which is described next.

When the transmission is shifted to one of the forward drive stages or the reverse stage, it is desirable that the idle speed of the engine is as low as possible from the view point of not causing the creeping of the automobile, provided that a rotation speed is enough to ensured a stable operation of the engine under the supervision of the driver, generally for a short period, and an mount of delivery of oil enough to accomplish a shifting of stages of the transmission at a desired quickness is available from the oil pump. The target value I3 for such conditions may generally be lower than I2, if the oil temperature is not higher than the above-mentioned threshold value Ta.

However, if the oil temperature is higher than the threshold value Ta, in order to ensure the desired quickness of the shifting of the stages, under the increased oil leakage in the oil pump, it is required that the idle speed of the engine is temporarily increased to such a relatively high speed level as shown by I4 in FIG. 4. When the shifting of the stages has been completed, since no further substantial delivery of oil is required, the target value for the idle speed may be decreased to a lower speed level such as I5 shown in FIG. 5, wherein I5 may be of the same level as exemplarily shown in FIG. 5.

Figure 5:
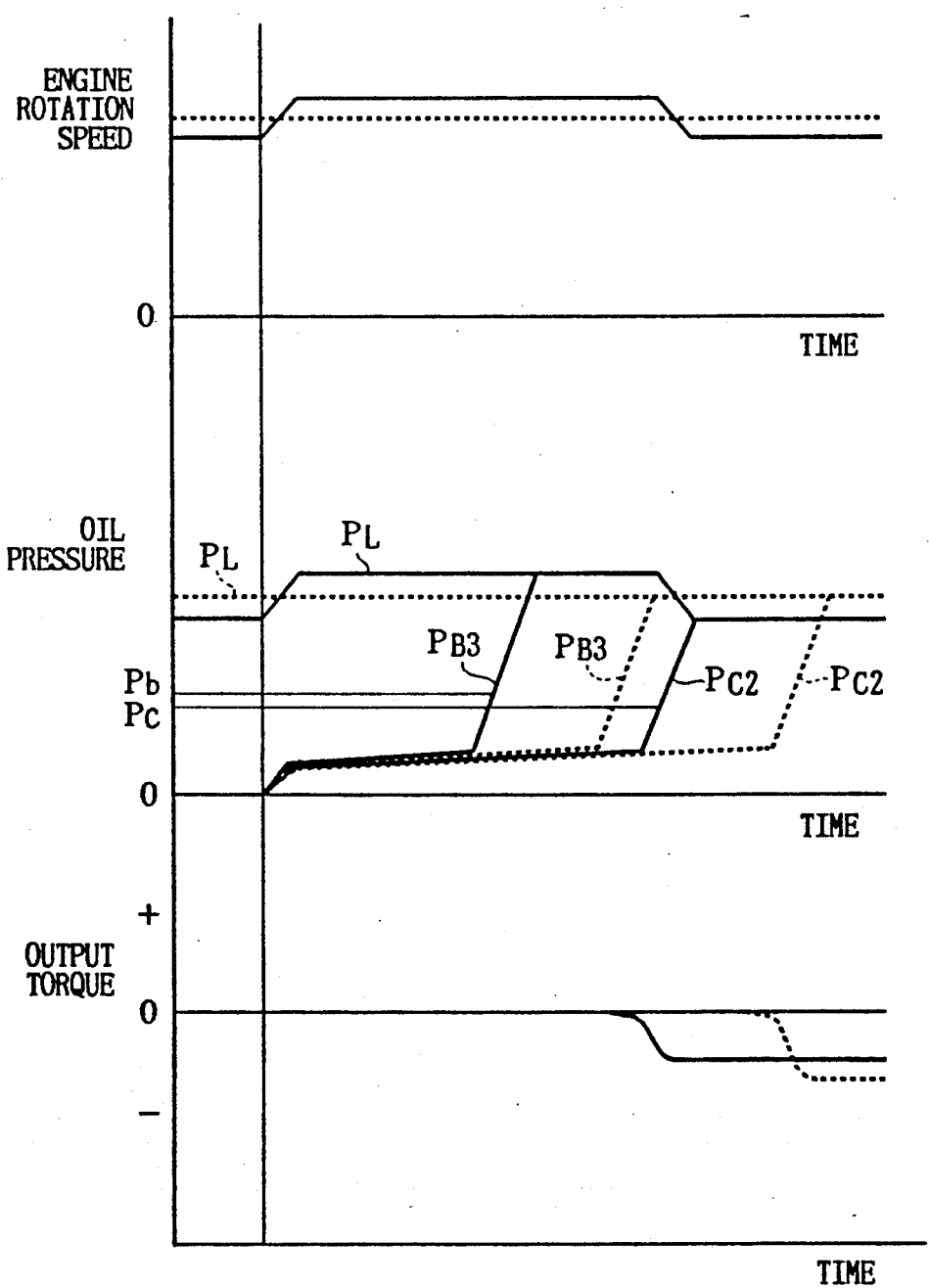
FIG. 5 is a composite diagram showing the performances of engine rotation speed, oil pressure and output torque available by the control steps shown in FIG. 3 in a shifting from the parking or neutral range to the reverse range, on a common time basis.

According to such a control of the target value for the idle speed of the engine, in the example of the shifting from the parking or neutral state to the reverse stage, the engine rotation speed, the line pressure PL generally known as the oil pressure regulated from the delivery of the oil pump to be a fundamental oil pressure in the hydraulic control system of the transmission, the oil pressures PB3 and PC2 in the brake B3 and the clutch C2, respectively, and the output torque of the transmission (negative for the reverse rotation) change as exemplarily shown in FIG. 5, wherein the solid lines show the performances available by the present invention, while the broken lines show the corresponding performances in the conventional art.

When the transmission is in the parking range or the neutral range, while the air conditioner is not put on, if the oil temperature of the transmission rises to such a relatively high level that the line pressure desirable to ensure a prompt start of engagement of the clutch C1 or C2 or further the brake B3 for establishing the 1st speed stage or the reverse stage is not available due an increased oil leakage in the oil hydraulic circuit of the transmission at the elevated oil temperature when the transmission was shifted from the parking or neutral range to any of the forward ranges or the reverse range, the idle speed of the engine may also be increased to such a target value as I2-2 that is higher than I2-1 for the normal idling in the parking or neutral range with no operation of the air conditioner. Since the engine has no load imposed thereon at this time other than the oil pump for the transmission, except basic engine auxiliaries such as a dynamo, a fuel injection pump and a water circulation pump, it will incur no substantial increase of energy consumption to increase the idle speed of the engine to such a level that maintains a desirable level of the line pressure for the prompt shifting from the parking or neutral range to the forward or reverse range.

It will be appreciated that, according to the present invention, the oil pump may be designed to provide a required capacity when the speed stage shifting has been completed, at or above an oil temperature which is generally attained after the warming up of the transmission under a moderate climate, so that in the speed stage shifting the idle up through the steps 8-10 is generally executed during the speed stage shifting. Or, alternatively, the threshold value Ta may be determined to such a high temperature that is attained only when the automobile is running with a heavy load under a hot climate, so that the steps 8-10 are only occasionally used as a special back-up system.

Although the invention has been described in detail with respect to a particular embodiment thereof, it will be apparent for one of ordinary skill in the art that various modifications are possible without departing the scope of the present invention.

We claim:

1. A control system for controlling idle operation of an engine of an automobile equipped with an automatic transmission including hydraulically actuated friction engaging means for shifting stages of the transmission and an oil pump driven by the engine to provide a pressurized oil for actuating said friction engaging means, comprising means for detecting temperature of the oil, means for detecting a speed stage shifting of the transmission, and means for determining an idle rotation speed of the engine for the idle operation thereof so as to temporarily increase said idle rotation speed for a period determined based upon a detection of the speed stage shifting of the transmission by said speed stage shifting detection means only when the oil temperature detected by said oil temperature detection means is higher than a threshold value above which the viscosity of the oil reaches such a value that oil leakage in the oil pump becomes substantial.

2. A control system according to claim 1, wherein the speed stage shifting based upon which said temporal increase of said idle rotation speed is executed is a shifting from a parking or neutral state to a stage for which more than one of said friction engaging means are newly engaged.

3. A control system for controlling idle operation of an engine of an automobile equipped with an automatic transmission including hydraulically actuated friction engaging means for shifting stages of the transmission and an oil pump driven by the engine to provide a pressurized oil for actuating said friction engaging means, comprising means for detecting temperature of the oil, means for detecting a speed stage shifting of the transmission, and means for determining an idle rotation speed of the engine for the idle operation thereof so as to temporarily increase said idle rotation speed for a period determined based upon a detection of the speed stage shifting of the transmission by said speed stage shifting detection means only when the oil temperature detected by said oil temperature detection means is higher than a threshold value, wherein the end of said period is determined by an increase of an oil pressure in at least one of said friction engaging means up to a predetermined pressure level.

4. A control system for controlling idle operation of an engine of an automobile equipped with an automatic transmission including hydraulically actuated friction engaging means for shifting stages of the transmission and an oil pump driven by the engine to provide a pressurized oil for actuating said friction engaging means; and an air conditioner, comprising:

means for detecting temperature of oil;
means for detecting shift positions of the transmission;
means for detecting operation of the air conditioner; and
means for determining an idle rotation speed of the engine for the idle operation thereof based upon a detection of operation of the air conditioner by said air conditioner operation detection means so as to increase said idle rotation speed when the air condition is put on,
said idle rotation speed determination means determining the idle rotation speed of the engine based upon a detection of a parking or neutral range of the transmission by said shift position detection means and a detection of the oil temperature by said oil temperature detection means so as to increase said idle rotation speed when the oil temperature is not less than a threshold value, while the air conditioner is not put on in the parking or neutral range.

* * * * *